US011097743B2

(12) United States Patent
Kasaiezadeh Mahabadi et al.

(10) Patent No.: US 11,097,743 B2
(45) Date of Patent: Aug. 24, 2021

(54) METHOD AND SYSTEM FOR CONTROLLING A VEHICLE BY DETERMINING A LOCATION OF AN OPTIMUM PERCEIVED YAW CENTER

(71) Applicant: GM Global Technology Operations LLC, Detroit, MI (US)

(72) Inventors: SeyedAlireza Kasaiezadeh Mahabadi, Shelby Township, MI (US); Seyedeh Asal Nahidi, North York (CA); Michael W. Neal, Fenton, MI (US); James H. Holbrook, Fenton, MI (US); John R. Yost, Southfield, MI (US); Hualin Tan, Novi, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 264 days.

(21) Appl. No.: 16/394,890

(22) Filed: Apr. 25, 2019

(65) Prior Publication Data

US 2020/0339135 A1    Oct. 29, 2020

(51) Int. Cl.
*B60W 40/13* (2012.01)
*B60W 30/02* (2012.01)

(52) U.S. Cl.
CPC .......... *B60W 40/13* (2013.01); *B60W 30/02* (2013.01); *B60W 2040/1315* (2013.01); *B60W 2040/1346* (2013.01); *B60W 2520/10* (2013.01); *B60W 2520/28* (2013.01); *B60W 2540/18* (2013.01)

(58) Field of Classification Search
CPC ................. B60W 40/13; B60W 30/02; B60W 2040/1346; B60W 2520/28; B60W 2540/18; B60W 2520/10; B60W 2040/1315
See application file for complete search history.

(56) References Cited

U.S. PATENT DOCUMENTS

| 6,658,342 | B1 | 12/2003 | Hac |
| 7,835,846 | B2 | 11/2010 | Chen et al. |
| 8,073,607 | B2 | 12/2011 | Sidlosky et al. |
| 8,565,993 | B2 * | 10/2013 | Lu ........................ B60W 30/045 701/70 |

(Continued)

OTHER PUBLICATIONS

Goggia, T. et al "Torque-Vectoring Control in Fully Electric Vehicles via Integral Sliding Modes" 2014, American COntrol Conference (ACC) Jun. 4-6, 2014, Portland, Oregon, USA (Year: 2014).*

*Primary Examiner* — Peter D Nolan
*Assistant Examiner* — Tanya C Sienko
(74) *Attorney, Agent, or Firm* — Cantor Colburn LLP

(57) ABSTRACT

A method and system of controlling a vehicle includes providing a plurality of dynamic state inputs to a controller in the vehicle that is adapted to execute a plurality of control loops and further includes determining an operating mode of the vehicle. Based on the operating mode of the vehicle, a location of an optimum perceived yaw center of the vehicle is determined corresponding to a selected estimation technique using the dynamic state inputs and wherein the estimation technique is selected based upon the determined operating mode of the vehicle. The information related to the location of the optimum perceived yaw center may be used as input for controlling the vehicle in a dynamic state.

18 Claims, 8 Drawing Sheets

(56) References Cited

U.S. PATENT DOCUMENTS

| | | |
|---|---|---|
| 9,199,637 B1 | 12/2015 | Kim et al. |
| 2002/0029102 A1* | 3/2002 | Badenoch ............ B60G 17/018 701/41 |
| 2017/0267280 A1 | 9/2017 | Mahabadi et al. |

* cited by examiner

US 11,097,743 B2

METHOD AND SYSTEM FOR CONTROLLING A VEHICLE BY DETERMINING A LOCATION OF AN OPTIMUM PERCEIVED YAW CENTER

INTRODUCTION

The subject disclosure relates generally to a method and system for determining a location of an optimum perceived yaw center based upon an operating mode of a vehicle which can be used to improve vehicle motion control.

Highly skilled human drivers, such as race car drivers, demonstrate the expert capability to conduct seemingly unstable and aggressive motion maneuvers in a safe manner. The professional drivers have a perception or "feel" for the vehicle motion that enables them to use the full lateral grip force of the tires to the limit, or even past the limit, of full lateral saturation points of the tires to improve agility and stability in extreme situations. This controlled utilization of the tire force capacity by expert human drivers improves maneuverability.

This same capability for aggressive maneuvers is desirable for non-professional drivers in an extreme maneuver for a sporty vehicle being used in an intended performance manner or in an emergency situation, such as high-speed obstacle avoidance or when sliding on icy roads. Vehicle motion control systems, such as active safety control systems or chassis control systems are designed to improve a motor vehicle's handling. The systems compare the driver's intentions, for example, by actual direction in steering, throttle, and/or braking inputs, to the motor vehicle's response, for example, lateral acceleration, rotation (yaw) rate and individual wheel speeds. The vehicle motion control systems then control the vehicle, for example, by braking an individual front or rear wheel, by steering the wheels, and/or by reducing excess engine power as needed to help avoid understeer (plowing) or oversteer (fishtailing).

However, these typical control systems limit the target yaw rates and target lateral velocity motions to stay within or even well under the saturation peak limit ranges of the tires for operating in a more conservative driving mode for a non-professional driver. Developing methods that cover a wide range of operation modes and at the same time are easily calibratable has been a challenge in the motion control field.

Accordingly, it is desirable to provide improved methods and systems for determining a location of an optimum perceived yaw center to provide information to enhance the vehicle motion control selectively based on an operation mode of the vehicle, particularly during extreme maneuvers.

SUMMARY

In one exemplary embodiment, a method of controlling a vehicle is disclosed. The method includes providing a plurality of dynamic state inputs to a controller in the vehicle that is adapted to execute a plurality of control loops, each dynamic state input indicative of a dynamic state of the vehicle. The method further includes determining an operating mode of the vehicle, determining a location of an optimum perceived yaw center of the vehicle corresponding to a selected estimation technique using the dynamic state inputs, such estimation technique being selected based upon the determined operating mode of the vehicle, storing information related to the location of the optimum perceived yaw center for the plurality of the control loops, and using the location of the optimum perceived yaw center as input for controlling the vehicle in a dynamic state.

In another exemplary embodiment, the method further includes determining the operating mode of the vehicle to be one of a transient mode or a limit handling mode.

In yet another exemplary embodiment, the dynamic state inputs include at least a steering angle, a forward vehicle speed, a wheel angular velocity, and a tire normal force.

In a further exemplary embodiment, the vehicle has a center of gravity, and the method further includes calculating a first offset distance from the location of the optimum perceived yaw center to the vehicle center of gravity, storing information relating to the first offset distance for the plurality of the control loops, and using the first offset distance as input for controlling the vehicle in the dynamic state.

In addition to one or more of the features described herein, the method further includes calculating a second offset distance from the location of the optimum perceived yaw center to a location of an actual inertial center of rotation of the vehicle, storing information relating to the second offset distance for the plurality of the control loops, and using the second offset distance as input for controlling the vehicle in the dynamic state.

In yet another exemplary embodiment, the vehicle has a center of gravity and determining the location of the optimum perceived yaw center for the vehicle is performed according to a relationship comprising:

$$v^*_y = v_x(\delta - L_r \alpha_r^{opt} - L_f \alpha_r^{opt})/L$$

$$r^* = v_x(\delta - L_r(\alpha_f^{opt} - \alpha_r^{opt}))/(L \times L_r)$$

$$v^*_y + dr^* \approx 0$$

where $\alpha_f^{opt}$ is a front optimum tire slip angle corresponding to a maximum feasible lateral force on vehicle front tires; $\alpha_r^{opt}$ is an rear optimum tire slip angle corresponding to a maximum feasible lateral force on vehicle rear tires; $v^*_y$ is an optimum lateral wheel center velocity; and $v_x$ is a vehicle longitudinal velocity; $\delta$ is a ground steering angle; L is a longitudinal distance between a front axle and a rear axle of the vehicle; Lr is a longitudinal distance between the rear axle and the vehicle center of gravity; Lf is a longitudinal distance between the front axle and the vehicle center of gravity; d is a longitudinal distance between the center of gravity and the location of the optimum perceived yaw center; and r* is an optimum yaw rate.

In yet another preferred embodiment, the operating mode of the vehicle is determined to be one of a transient mode or a limit handling mode and the foregoing relationships are used to determine the location of the optimum perceived yaw center when the vehicle is determined to be in the limit handling mode.

In yet another embodiment, a method of determining a location of an optimum perceived yaw center of a vehicle comprises sensing a plurality of dynamic state parameters of the vehicle, providing a plurality of dynamic state inputs which are representative of the dynamic state parameters to a controller in the vehicle that is adapted to execute a plurality of control loops, each dynamic state parameter indicative of a dynamic state of the vehicle, determining an operation mode of the vehicle as one of a transient mode or a limit handling mode at each dynamic state, and determining a location of an optimum perceived yaw center based on a first approach when the vehicle is determined to be in the transient mode and determining the location of the optimum perceived yaw center based on a second approach when the vehicle is determined to be in the limit handling mode. The method further including the steps of storing the information related to the location of the optimum perceived yaw center as input to a vehicle controller and controlling the vehicle in response to the location of the optimum perceived yaw center as an input to the controller.

In yet another embodiment, the method includes calculating the location of the optimum perceived yaw center when the vehicle is determined to be in the transient mode according to a relationship wherein the location of the optimum perceived yaw center is estimated to be located at a rear axle of the vehicle.

In a further embodiment, the method of method of determining a location of an optimum perceived yaw center of a vehicle includes determining the location of the optimum perceived yaw center when the vehicle is determined to be in the in the limit handling mode according to a relationship comprising:

$$v^*_y = v_x(\delta - L_r \alpha_f^{opt} - L_f \alpha_r^{opt})/L$$

$$r^* = v_x(\delta - L_r(\alpha_f^{opt} - \alpha_r^{opt}))/(L \times L_r)$$

$$v^*_y + dr^* \approx 0$$

where $\alpha_f^{opt}$ is a front optimum tire slip angle corresponding to a maximum feasible lateral force on vehicle front tires; $\alpha_r^{opt}$ is an rear optimum tire slip angle corresponding to a maximum feasible lateral force on vehicle rear tires; $v^*_y$ is an optimum lateral wheel center velocity; and $v_x$ is a vehicle longitudinal velocity; $\delta$ is a ground steering angle; L is a longitudinal distance between a front axle and a rear axle of the vehicle; $L_r$ is a longitudinal distance between the rear axle and the vehicle center of gravity; $L_f$ is a longitudinal distance between the front axle and the vehicle center of gravity; d is a longitudinal distance between the center of gravity and the location of the optimum perceived yaw center; and r* is an optimum yaw rate.

In another embodiment, the method includes providing dynamic state parameters including at least a steering angle, a forward vehicle speed, a wheel angular velocity, and a tire normal force.

In a further embodiment, a system of controlling a vehicle, comprises a sensor system having a plurality of sensors for sensing dynamic state inputs, the dynamic state inputs indicative of a dynamic state of the vehicle, and a controller adapted to execute a plurality of control loops and receive the plurality of the dynamic state inputs during its operation to determine an operating mode. The system also includes the controller having a processor further adapted to estimate a location of an optimum perceived yaw center of the vehicle corresponding to a selected estimation technique, such estimation technique being selected based upon the determined operating mode of the vehicle, and an actuator system that is adapted to communicate with the controller to provide control of the dynamic state of the vehicle in response to the location of the optimum perceived yaw center.

In a further embodiment, the system of controlling a vehicle includes the processor adapted to determine the operating mode of the vehicle to be one of a transient mode or a limit handling mode at the dynamic state of the vehicle.

In another embodiment, the system has dynamic state inputs including at least a steering angle, a forward vehicle speed, a wheel angular velocity, and a tire normal force.

In yet another embodiment, the system includes a vehicle having a center of gravity and when the vehicle is in the limit handling mode, the selected estimation technique to determine the location of the optimum perceived yaw center for the vehicle is performed according to a relationship comprising:

$$v^*_y = v_x(\delta - L_r \alpha_f^{opt} - L_f \alpha_r^{opt})/L$$

$$r^* = v_x(\delta - L_r(\alpha_f^{opt} - \alpha_r^{opt}))/(L \times L_r)$$

$$v^*_y + dr^* \approx 0$$

where $\alpha_f^{opt}$ is a front optimum tire slip angle corresponding to a maximum feasible lateral force on vehicle front tires; $\alpha_r^{opt}$ is an rear optimum tire slip angle corresponding to a maximum feasible lateral force on vehicle rear tires; $v^*_y$ is an optimum lateral wheel center velocity; and $v_x$ is a vehicle longitudinal velocity; $\delta$ is a ground steering angle; L is a longitudinal distance between a front axle and a rear axle of the vehicle; $L_r$ is a longitudinal distance between the rear axle and the vehicle center of gravity; $L_f$ is a longitudinal distance between the front axle and the vehicle center of gravity; d is a longitudinal distance between the center of gravity and the location of the optimum perceived yaw center; and r* is an optimum yaw rate.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
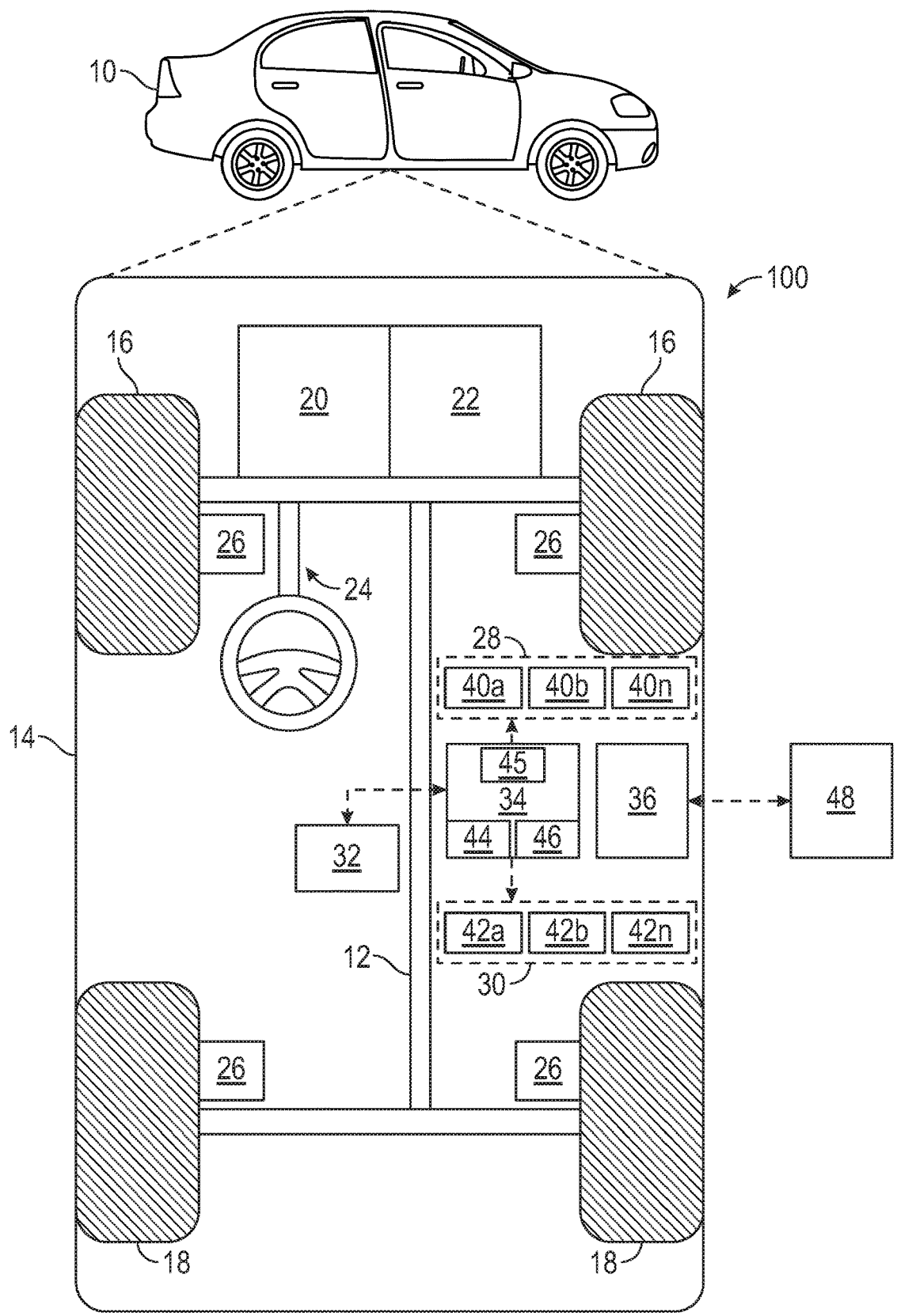
FIG. 1 shows a vehicle including an associated vehicle control system in accordance with various embodiments.

The following detailed description is merely exemplary in nature and is not intended to limit the present disclosure, its application or uses. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments may be described herein in terms of functional and/or logical block components and various processing steps. It should be appreciated that such block components may be realized by any number of hardware, software, and/or firmware components configured to perform the specified functions. For example, an embodiment may employ various integrated circuit components, (e.g., memory elements, digital signal processing elements, logic elements, look-up tables, or the like,) which may carry out a variety of functions under the control of one or more microprocessors or other control devices. In addition, those skilled in the art will appreciate that embodiments may be practiced in conjunction with any number of control systems, and that the vehicle system described herein is merely one example embodiment.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

Although the figures shown herein depict an example with certain arrangements of elements, additional intervening elements, devices, features, or components may be present in actual embodiments. It should also be understood that the figures are merely illustrative and may not be drawn to scale.

In accordance with an exemplary embodiment, FIG. 1 shows a vehicle 10 including an associated vehicle motion control system shown generally at 100 in accordance with various embodiments. In general, the control system 100 assists the driver in controlling the vehicle 10. The vehicle 10 generally includes a chassis 12, a body 14, front wheels 16, and rear wheels 18. The body 14 is arranged on the chassis 12 and substantially encloses components of the vehicle 10. The wheels 16, 18 are each rotationally coupled to the chassis 12 near a respective corner of the body 14.

In various embodiments, the vehicle 10 may preferably be a sporty, high performance vehicle. It is appreciated that the vehicle 10 is not limited to a traditional performance vehicle. For example, the vehicle 10 may be an autonomous or semi-autonomous vehicle that is automatically controlled to carry passengers from one location to another. The vehicle 10 is depicted in the illustrated embodiment as a passenger car, but it should be appreciated that any other vehicle including trucks, sport utility vehicles (SUVs), recreational vehicles (RVs), etc., can also be used. As shown, the vehicle 10 generally includes a propulsion system 20, a transmission system 22, a steering system 24, a brake system 26, a sensor system 28, an actuator system 30, at least one data storage device 32, at least one controller 34, and a communication system 36.

The propulsion system 20 may, in various embodiments, include an internal combustion engine, a battery electric propulsion system and/or with electric motors, and/or a fuel cell propulsion system. The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16, 18. The brake system 26 may, in various embodiments, include friction brakes, brake by wire, a regenerative braking system such as an electric machine, and/or other appropriate braking systems. The steering system 24 influences a position of the of the vehicle wheels 16, 18. While depicted as including a steering wheel 25 for illustrative purposes, in some embodiments contemplated within the scope of the present disclosure, the steering system 24 may not include a traditional steering wheel, but may include a steering input through another mechanism, such as a joystick or other automated device that transmits the driver input to steer the wheels 16, 18 of the vehicle 10 in a certain desired direction.

The sensor system 28 includes one or more sensing devices 40a-40n associated with the various vehicle components. Sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

With continuing reference to FIG. 1, the vehicle 10 includes a control module or controller 34. As can be appreciated, various exemplary embodiments of the control module 34, according to the present disclosure, may include any number of modules and/or sub-modules. In various exemplary embodiments, the modules and sub-modules, such as those described in FIG. 1 and FIG. 3 may be combined and/or further partitioned. In various embodiments, it will be appreciated that the control module 34 may receive inputs from the one or more of the sensing devices 40a-40n, from other control modules (not shown) within the vehicle 10, and/or from other modules (not shown) within the control module 34.

The controller 34 includes at least one processor 44 and computer readable storage device or media 32. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 32 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 32 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions stored in the memory storage device 32 include logic for controlling the performance of the control module 34 and may provide scheduling, input-output control, file and data management, memory management, and communication control and related services. In various embodiments, the instructions are further configured to control one or more component control systems including actuators 42a-42n. As described in detail herein, the instructions further include instructions adapted to determine the operating mode of the vehicle 10, adapted to determine the location of the optimum perceived yaw center, and adapted to use the location of the optimum perceived yaw center to enhance vehicle motion control.

The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The processor 44 further has programs for operating the vehicle 10 based on at least one of two modes of operation; a standard or transient mode of operation, and a performance or limit handling mode of operation. It will be appreciated that terms "transient mode" and "standard mode" will be used interchangeably herein and have the same meaning, and that the terms "performance mode" and "limit handling mode" will be used interchangeably herein and also have the same meaning. In the standard mode of operation, the processor 44 operates a standard model of the vehicle 10 that provides a generally linear relation between driver's inputs and vehicle dynamics.

In the performance mode of operation, the processor 44 operates a performance model of the vehicle 10. The performance model is generally a non-linear model of the vehicle 10 and generally takes in more input than the standard model to determine dynamic parameters for the vehicle 10. For example, the standard model generally takes a driver's steering wheel angle as an input, while the performance model generally takes a tractive torque on a tire and a braking torque on the tire, in addition to the steering wheel angle, in order to determine the associated dynamic parameter. Thus, the performance model includes inputs from the accelerator pedal and brake pedal in addition to the steering wheel angle in order to define the dynamic states of the vehicle. The performance mode further uses several actuators 42a-42n that are not used in the standard mode of operation. Exemplary performance actuators used in the performance mode of operation include but are not limited to electronically-limited slip differential actuator (eLSD) which controls a left-right torque distribution at the vehicle, an electronic All-Wheel Drive configuration (eAWD) which controls a front-back torque-distribution at the vehicle and a differential braking actuator (dB).

Figure 2A:
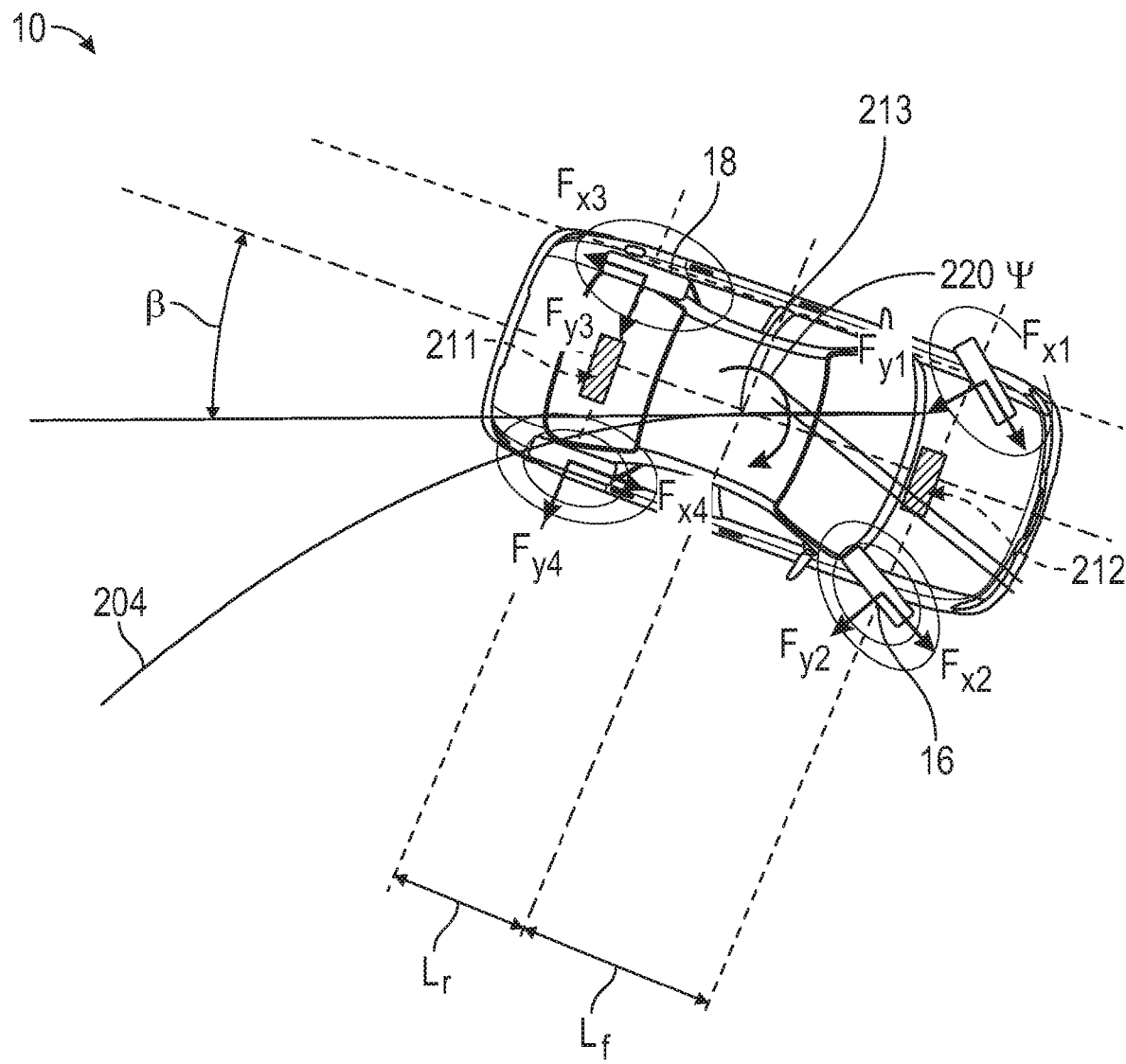
FIG. 2A shows a top view of the vehicle illustrating various forces on the vehicle during a maneuver.

FIG. 2A shows a top view of the vehicle 10 illustrating various forces acting on the vehicle during a maneuver. The vehicle 10 is shown moving along a selected trajectory 204. Tire forces (Fx1, Fy1), (Fx2, Fy2), (Fx3, Fy3) and (Fx4, Fy4) are shown for each of the tires 16, 18. The yaw rate w is indicated by rotational arrow 220. Performance mode actuators are also shown. For example, the eLSD 211 is located between the rear wheels and controls a left-right torque distribution at the vehicle. The eAWD 212 is located between the front wheels and which controls a front-back torque-distribution at the vehicle. Another actuator, the active-aero actuator (not shown) helps to control the normal force on the tires of the vehicle 10.

Figure 2B:
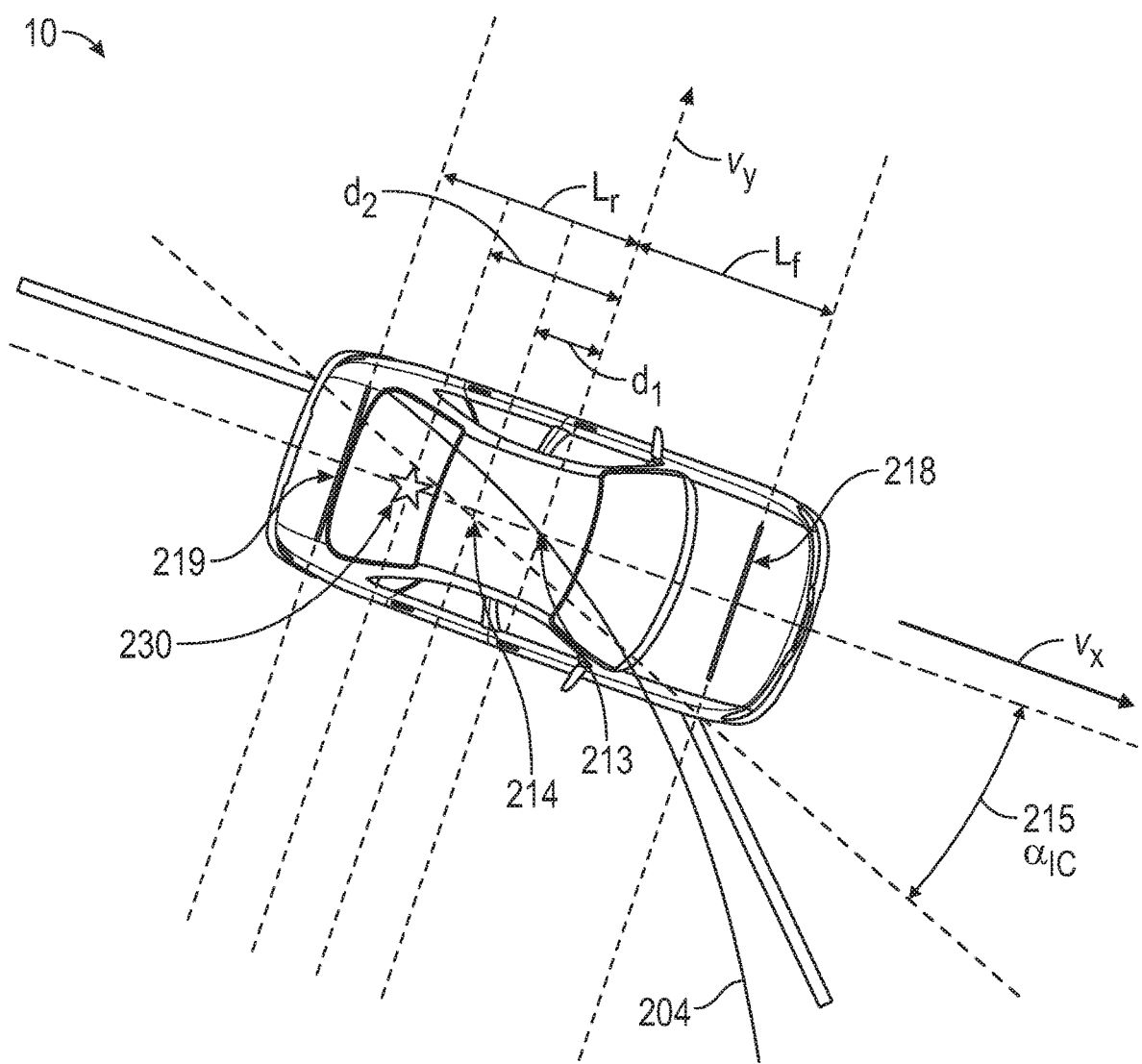
FIG. 2B shows a top view of the vehicle illustrating other various forces on the vehicle during a maneuver.

With reference to FIG. 2B, when the vehicle 10 moves along the trajectory 204, the vehicle has a continuously changing dynamic inertial center of rotation (ICR) 214 which is dependent upon the path, including curvature, of the trajectory 204. The ICR 214 may be dynamically located at any position on the vehicle 10 dependent on the maneuver, and is not necessarily at the vehicle center of loading). Furthermore, the vehicle 10 moving along the trajectory 204 has a side slip angle $\alpha_{IC}$ 215. $L_r$ is defined as the longitudinal distance between the rear axle 219 and the center of gravity 213. $L_f$ is defined as the longitudinal distance between the front axle 218 and the center of gravity 213.

Maneuver agility is the vehicle's ability to change, rapidly and precisely, its motion path or heading axis and to its ease of completing that change. In practice, the desired vehicle response intended by the driver varies based on the vehicle operation mode. During the standard or transient mode, the driver desires the best maneuver agility for routine handling. During the performance or limit handling mode, the driver desires maximum lateral tire grip for the best lateral control and stability of the vehicle 10. A method of estimating the location of the optimum perceived yaw center based on a determined mode of vehicle operation to be used for enhancement of motion control of the vehicle 10 is presented.

A perceived yaw center (also referenced herein as the "PYC"), is a conceptual point within the vehicle body coordinates that changes instantly and dynamically during handling performances. The location of the PYC is affected by the yaw and lateral motions of the vehicle 10. In routine transient handling maneuvers, ideally in-phase yaw and lateral motion occur when the rear axle 219 is considered as the pivot point and center of yaw motion. In limit handling maneuvers, the vehicle aims to consume all of the capacity of the tires 16, 18 in the lateral direction to assist the driver during a severe maneuver, such as a tight turn. Depending on the operating mode of the vehicle 10, the location of an optimum PYC 230 can be dynamically estimated and used as an input to improve vehicle motion control.

With continuing reference to FIG. 2B, the location of the optimum perceived yaw center (also referenced herein as "OPYC") provides the desired location of a conceptual point within the vehicle body coordinates that the vehicle 10 should appear to yaw about for the best perception for control of the vehicle 10 by the driver. During a vehicle maneuver, the vehicle 10 is rotating around the actual inertial center of rotation 214. The offset distance d1 may be calculated as the longitudinal distance between the center of gravity 213 and the ICR 214. The driver's perceived yaw center can be anywhere on the vehicle and constantly and dynamically changing based on the maneuver. The methodology for determining the location for the optimum perceived yaw center 230 which can then be used as information to determine the best vehicle controls and to assist the driver is further described herein. The offset distance d2 between the center of gravity 213 and the OPYC 230 may also be determined and used as input to the vehicle control system 100. The driver might perceive a yaw center that is not the optimum and provide actual steering input based on that perception. A method for continuously and dynamically estimating the location of the optimum perceived yaw center 230 in real time for improved vehicle control is provided herein.

In limit handling mode, the location of the OPYC 230 is estimated to achieve maximum lateral grip between the road and tires. At each dynamic sampling time in real time on the vehicle 10, the estimated normal force and slip ratio at each corner as well as empirical tire tables are used to find slip angle corresponding to the maximum lateral force for front and rear axles. As noted, the slip angle α is the angle between tire plane (desired heading defined by driver via the steering angle being the actual driver steering input) and the direction of the actual vehicle motion.

In performance driving, a professional driver tends to fully utilize the unused capacity of the tires in the lateral direction to achieve higher lateral accelerations. For a certain normal (or downward) force and slip ratio, the front and rear slip angles corresponding to a given lateral force of the tires can be calculated through empirical tire tables, as:

$$\alpha_f = \delta_f - \frac{v_{yc} + L_f r}{v_x} \text{ and } \alpha_r = -\frac{v_{yc} - L_r r}{v_x} \quad (1)$$

with front tire slip angle:

$$\alpha_f = \delta_f - \frac{V_{yc} + L_f r}{V_{xc}} \quad (2)$$

with rear tire slip angle:

$$\alpha_r = \delta_r - \frac{V_{yc} - L_r r}{V_{xc}} \quad (3)$$

where:
$\alpha_f$ is the front tire slip angles corresponding to lateral force on the front tires;
$\alpha_r$ is the rear tire slip angles corresponding to a lateral force on the rear tires;
r is vehicle yaw rate;
$\delta_f$ and $\delta_r$ are ground steering angles;
$V_{yc}$ and $V_{xc}$ are wheel center lateral and longitudinal velocities;
$L_f$ and $L_r$ are distances between "front axle to center of gravity" and "rear axle to center of gravity" respectively.

Figure 5:
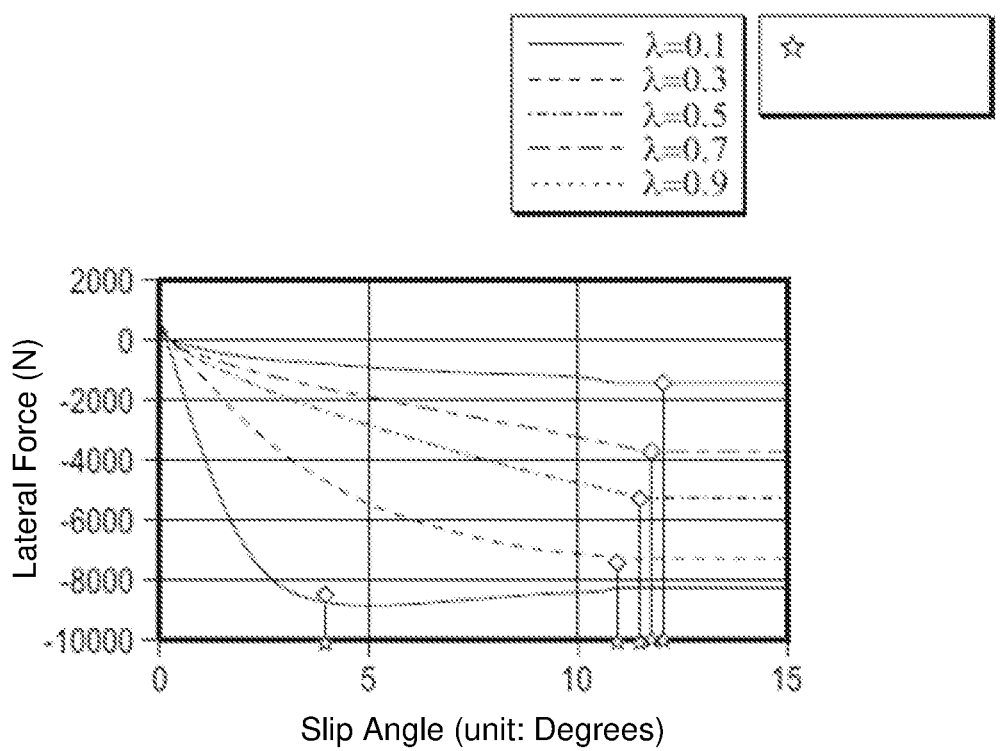
FIG. 5 shows a graph with experimental curves generated that plot the normal force and the longitudinal slip of a tire to determine the optimum slip angle.

With reference to FIG. 5, empirical tire lookup tables can be generated experimentally through testing. The experimental curves that generate the lookup tables plot the normal force versus time and the longitudinal slip versus time to determine the optimum slip angle. An exemplary table is shown in FIG. 5. Such lookup tables can be experimentally generated by skilled testing facilities for each particular tire. The optimum slip angle output is the point at which the maximum lateral force is achieved. Based on experimental testing for any given tire, the lateral force can be plotted for a given slip angle and certain normal force to determine the maximum lateral force for any given slip ratio λ to determine the optimum slip angles for the tire.

The estimation of the location of the OPYC when the vehicle is in the limit handling mode is determined corresponding to the situation when all tires are saturated in the lateral direction as calculated per the following equations:

$$v^*_y = v_x(\delta - L_r\alpha_f^{opt} - L_f\alpha_r^{opt})/L \quad (4)$$

$$r^* = v_x(\delta - L_r(\alpha_f^{opt} - \alpha_r^{opt}))/(L \times L_r) \quad (5)$$

where:
$\alpha_f^{opt}$ is the front optimum slip angle corresponding to a maximum feasible lateral force on the front tires;
$\alpha_r^{opt}$ is the rear optimum slip angle corresponding to a maximum feasible lateral force on the rear tires;
δ is the ground steering angle;
$V_x$ is vehicle longitudinal velocity;
$L_r$ is the longitudinal distance between the rear axle and the center of gravity;
$L_f$ is the longitudinal distance between the front axle and the center of gravity;
L is the longitudinal distance between the front axle and the rear axle of the vehicle; and
$\alpha_f^{opt}$ and $\alpha_r^{opt}$ are the optimum slip angles for the front and rear, respectively;
r* is the optimum yaw rate; and
$v^*_y$ is the optimum lateral velocity.

The optimum perceived yaw center is determined as the point where the lateral slip becomes zero:

$$v^*_y + dr^* = 0 \quad (6)$$

where:
d is the distance between the CG and the location of the optimum perceived yaw center;
r* is the optimum yaw rate; and
$v^*_y$ is the optimum lateral velocity.

In the transient mode, the driver desires the best possible maneuver agility. Agility can be improved by minimizing delay between the steering input and the turning of the vehicle with short response times.

To quantify agility performance for transient mode, for example, one can use rise time in yaw rate response. In the transient mode, the location of the OPYC can be determined with the goal of minimizing the rise-time response. In transient handling maneuvers, ideally in-phase yaw and lateral motion occurs when rear axle is considered as the pivot point and center of yaw motion.

Figure 8A:
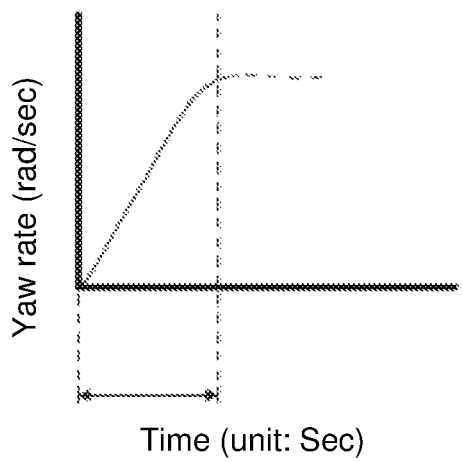
FIG. 8A shows a graph of yaw rate versus time with a longer response time.
Figure 8B:
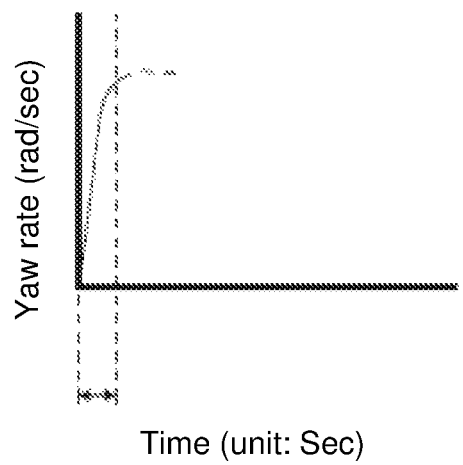
FIG. 8B shows a graph of yaw rate versus time for a shorter response time.

As a first step in the process for the transient mode, the sensors 40a-40n provide inputs of at least steering angle, forward speed, wheel angular velocity and tire normal force. The location of the OPYC is not necessarily at the vehicle center of gravity. The vehicle manufacturer has desired agility metrics for the best desired performance based on speed and steering input. These metrics provide the desired OPYC for a given speed and steering input. Based on the vehicle model metrics, an OPYC can be used to determine the desired yaw rate and lateral velocity for the vehicle. The OPYC can be determined for each metric that can be determined experimentally for the vehicle for the best performance. Referring to FIG. 8A and FIG. 8B, two exemplary curves are shown that plot yaw rate on the vertical axis versus time on the horizontal axis. The desired approach in the transient mode is to have a curve more like the second curve of FIG. 8B with the shortest possible rise time for a quicker agility response.

In the transient mode, experimental lookup tables may be used to determine the location of the OPYC 230 based on the desired time rate response for the vehicle 10. Another approach for the transient mode is that the location of the optimum perceived yaw center may be determined according to a relationship wherein the distance between the vehicle center of gravity 213 and the location of the OPYC is estimated to be the longitudinal distance between the center of gravity 213 and a rear axle 219 of the vehicle 10.

Figure 3:
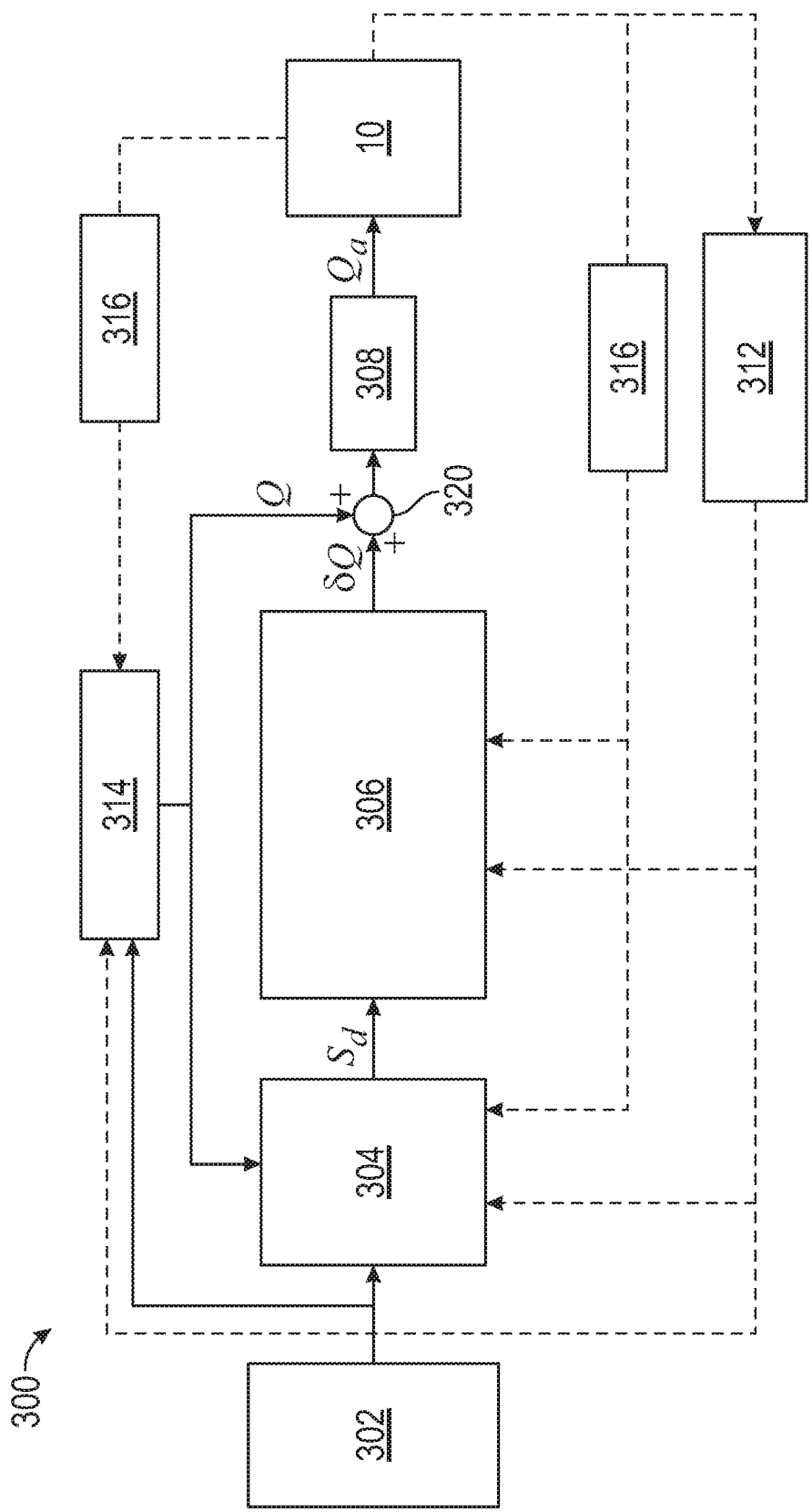
FIG. 3 shows a control structure for operating the vehicle in a driver-assisted mode.

FIG. 3 shows a control structure 300 for operating the vehicle 10 in a driver-assisted mode. In various aspects, the control structure 300 includes various modules that operate on the processor 44 in order to translate a driver's intentions into actual motion of the vehicle 10. The control structure 300 includes a target state determination module 304, a vehicle control module 306, and actuators 308. The target state determination module 304 determines a desired state of the vehicle 10 based on the driver's inputs. The vehicle control module 306 determines a command control adjustment based on the desired state and operates actuators 308 in order to control the vehicle 10. Actuators 308 may include those described as 42a-42n of the vehicle 10.

The control structure 300 receives driver's inputs 302, such as a steering wheel angle, a brake pedal position and a pedal position, from the driver. The driver's inputs 302 are provided to the target state determination module 304. The target state determination module 304 computes a desired state (Sd) based on the driver's inputs and provides the desired state Sd to the vehicle control module 306. The desired state Sd can include, but is not limited to, the desired yaw rate, the location of the optimum perceived yaw center for the vehicle 10 and a desired side slip angle of the vehicle 10. The driver's inputs are also provided to a feedforward control module 314.

The vehicle control module 306 generates an actuator adjustment command (δQ) for the vehicle 10 based on the desired state Sd. The actuator adjustment command δQ can be added to an actuator command (Q) that corresponds to the driver's inputs 320. The actuator command Q is provided from the feedforward control module 314. A summation (Q+δQ) is provided to the actuators 308 in order to provide an action Qa that operates the vehicle 10. The actuators can include, for, the eLSD, the eAWD, a differential braking actuator (dB) and the Active-Aero actuator. The actuators 308 are used to generate the desired states (e.g., yaw rate and side slip angle) at the vehicle 10.

The vehicle 10 thus undergoes the desired dynamic state, such as the desired yaw rate and/or the desired side slip angle. Sensors 316 on the vehicle 10 can detect these dynamic parameters and their values. It will be appreciated that sensors 316 may include those described as 40a-40n herein. In addition, a vehicle state estimate and fault detection module 312 can estimate the values of these dynamic parameters. The sensed values of these dynamic parameters and the estimated values of these dynamic parameters can be provided to the vehicle control modules 306 in order to help the vehicle control module 306 determine the command actuator adjustment δQ for a next time step of the vehicle control. These sensed and estimated values can also be provided to the target state determination module 304 in order to control calculation of the desired state Sd. Such feedback prevents the desired state Sd generated by the target state determination module 304 from changing too rapidly. The sensed values and estimated values can be further provided to the feedforward control module 314.

At a step in the process prior to choosing the approach or technique or relationships (as detailed herein) to calculate the location of the OPYC 230, the method requires that the vehicle control module system 100 first determines the operating mode of the vehicle 10 to be either one of a transient mode or a limiting handling mode. An approach for determining whether the vehicle 10 is in a transient mode or a limit handling mode will now be described in detail herein and is also incorporated by reference to U.S. patent application Ser. No. 15/902,625, which is commonly assigned to the same assignee as the present disclosure.

Figure 4:
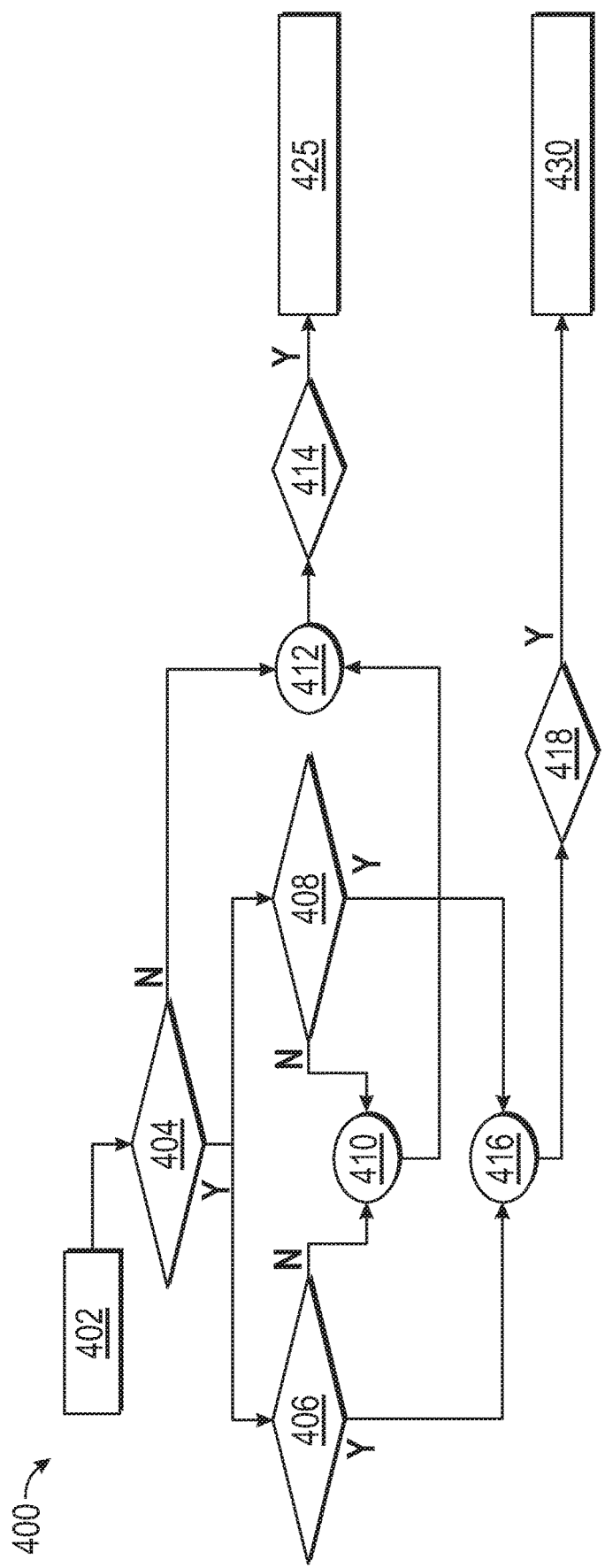
FIG. 4 shows a flowchart for making a decision selecting a mode of operation for the vehicle.

FIG. 4 shows a flowchart 400 for making a decision selecting a mode of operation for the vehicle, (i.e., selecting either the standard (or transient mode) or the performance (or limit handling mode)). In box 402, various inputs, such as lateral acceleration ay, steering wheel angle δ and accelerator position p, are provided to the vehicle. The steering wheel angle δ and accelerator position p are driver's inputs while the lateral acceleration ay is a dynamic parameter of the vehicle. Thresholds can be defined for each of these inputs based on manufacturer's specifications and other considerations.

In decision box 404, the lateral acceleration $a_y$ of the vehicle is compared to the lateral acceleration threshold $a_{y,th}$. If the lateral acceleration is less than or equal to the lateral acceleration threshold (i.e., if ay<=ay,th), then the process flows to OR gate 412. Otherwise, if the lateral acceleration is greater than the lateral acceleration threshold (i.e., if $a_y > a_{y,th}$), then the method proceeds to boxes 406 and 408.

In decision box 406, the acceleration position p is compared to a threshold $pth(V_x)$ for the accelerator pedal position. The threshold $pth(V_x)$ is a velocity-dependent threshold. The position threshold $pth(V_x)$ is a function of a longitudinal speed of the vehicle. In decision box 408, the steering wheel angle δ is compared to a steering wheel angle threshold $δ(V_x)$, which is also a function of the longitudinal speed of the vehicle 10.

Observing the combination of decision boxes 404, 406 and 408 as well as the logical decision boxes 410, 412, a decision can be made whether the vehicle is to be driven in standard mode or can be shifted from a performance mode to the standard mode. In particular, when the lateral acceleration does not exceed the lateral acceleration threshold (i.e., if $a_y <= a_{y,th}$), then via OR gate 412, a logical 'true' state is provided to decision box 414, which selects the standard mode of operation 425.

Alternatively, when the lateral acceleration exceeds the lateral acceleration threshold (i.e., if $a_y > a_{y,th}$), a test is made of the accelerator position and the steering wheel angle. When both of these parameters are less than their respective thresholds, the OR gate 410 and OR gate 412 combine to send a 'true' signal to decision box 414 in order to select the standard mode of operation 425. However, if each of the accelerator position and the steering wheel angle exceed their respective thresholds, then OR gate 416 provides a 'true' signal to logical decision box 418 that selects the performance mode of operation 430.

Figure 6A:
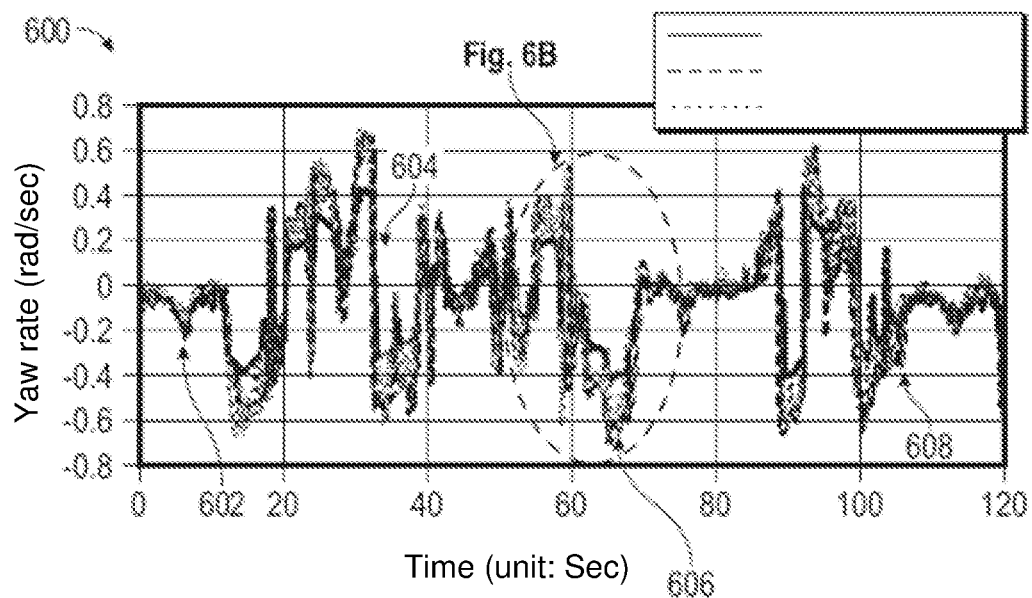
FIG. 6A shows a graph comparing target yaw rates from a vehicle being driven on the same track with a standard model control, a performance model control, and an actual professional driver.

FIG. 6A shows a graph 600 comparing target yaw rates against time that can be achieved using standard models and performance models of the vehicle 10 based on input to the respective models. In linear regions of operation, such as regions 602 and 604, there is very little difference between the yaw rate of the standard mode of operation and the yaw rate in the performance mode. However, at extreme yaw rates, such as at 606 and 608, there is a noticeable difference between the yaw rates. In other words, the performance mode can tolerate higher yaw rates than the standard mode and still remain stable. These known control systems limit the target yaw rates and target lateral velocity motions to stay within or even well under the saturation peak limit ranges of the tires for operating in a more conservative standard or transient driving mode for a non-professional driver. The graph 600 further shows the actual yaw rate when the vehicle is controlled by a highly skilled professional driver that can tolerate even higher yaw rates than the performance mode and yet still remain in control of the vehicle 10.

Figure 6B:
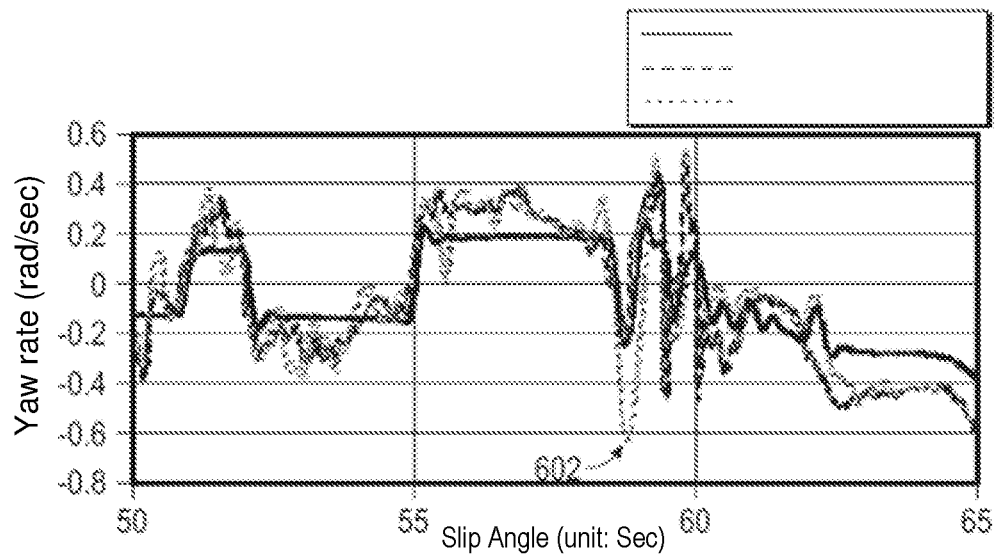
FIG. 6B shows an enlarged portion of FIG. 6A.

FIG. 6B shows an enlarged portion of FIG. 6A labeled as 606 in FIG. 6A at the time from about 50-65 seconds. Referring to region 602 of FIG. 6B, it is shown that the skilled driver can well-exceed the yaw rate of the test vehicle, yet still stay in control of the vehicle. This is due in part to the professional drivers having an accurate dynamic perception or "feel" for the location of OPYC that enables them to use the full lateral grip force of the tires to the limit, or even past the limit, of full lateral saturation points of the tires to improve agility in extreme situations while keeping the vehicle safely under control. It is desirable to provide this controlled utilization of the tire force capacity by expert humans in a driver-assisted vehicle by utilizing the location of the OPYC as an input for vehicle control.

Figure 7:
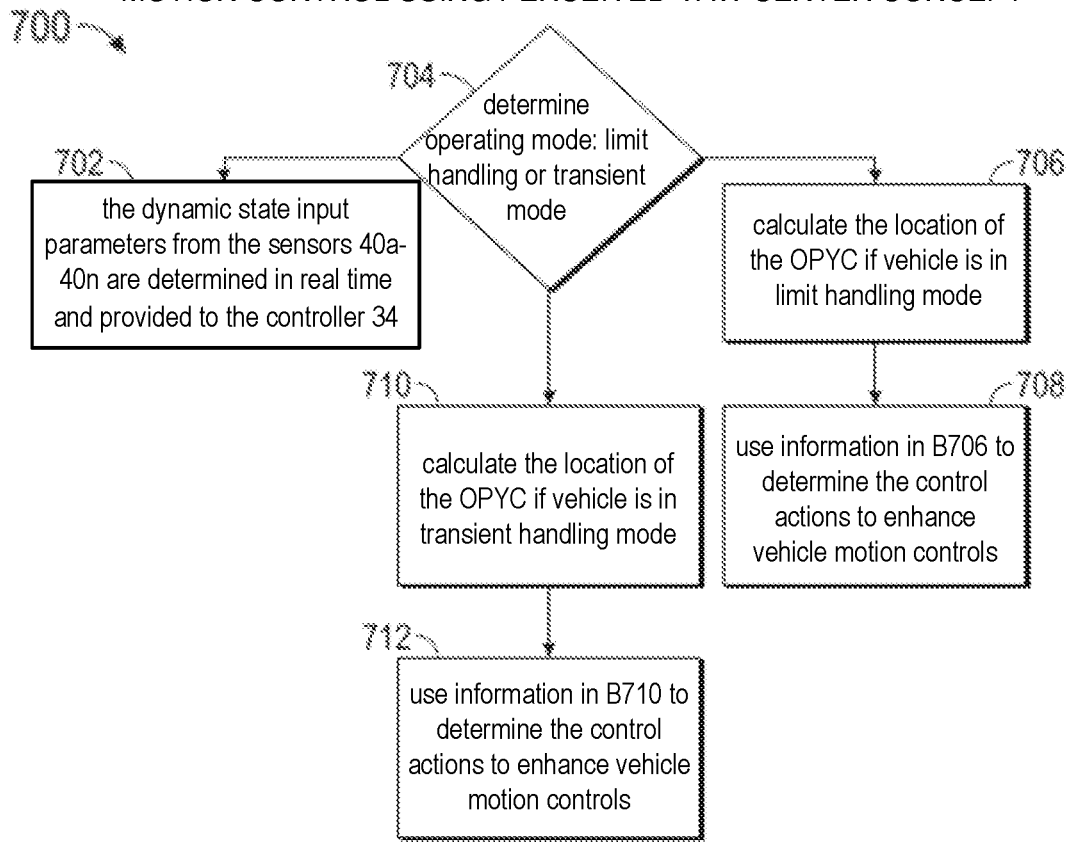
FIG. 7 shows a schematic diagram illustrating a method for controlling the vehicle in accordance with the present disclosure.

The methodology of controlling the vehicle in accordance with the disclosure is shown generally at FIG. 7 with the schematic diagram 700. At 702, the dynamic state input parameters from the sensors 40a-40n are determined in real time and provided to the controller 34, as described herein. The inputs for the determination of the dynamic parameters are measured or estimated. With reference to FIGS. 2A and 2B and other foregoing descriptions, the dynamic parameters from the vehicle 10 needed are at least steering angle, forward speed, wheel angular velocity and tire normal force. While these dynamic parameters may be measured, calculated or estimated, the preferred method is that the steering wheel angle and the wheel angular velocity are directly measured using any appropriate sensor for such measurement. The forward speed and the tire normal forces may be dynamically output from an inertial measurement unit (IMU) of the vehicle using inputs from sensors such as longitudinal and lateral accelerations, yaw rate and wheel velocity sensors. It will also be appreciated that the steering angle, forward speed, wheel angular velocity and tire normal force may be directly measured, calculated or estimated using any appropriate sensors and processors to develop these parameters as input directly or indirectly to the calculation of the location of the OPYC.

At 704, the operation mode of the vehicle is determined to be the transient mode or the limit handling mode by the above-described preferred method or other suitable method. Based on determination of the operating mode at 704, then the proper technique can be selected to determine the location of the optimum perceived yaw center in accordance with the determined operating mode of the vehicle 10 to further enhance the vehicle motion control. If the vehicle 10 is in the limit handling mode, then the first technique at 706 is used to calculate the location of the OPYC as described herein. If the vehicle 10 is in the transient mode, then one of the second techniques described herein is used to estimate the location of the OPYC at 710. After the determination of the location of the OPYC at 706 or 710, the OPYC as well offset distance from the location of the OPYC relative to the vehicle center of gravity, and the target yaw rate, and the actual yaw rate can all be provided as information stored in the data storage device 32 for use by the controller 34 in real time. This information from 706 and 710 can be used as input to the vehicle control system 100 for enhancement of vehicle control in further driver-assist methodologies (not described herein) at 708 and 712.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed but will include all embodiments falling within the scope thereof

What is claimed is:

1. A method of controlling a vehicle, comprising:
providing a plurality of dynamic state inputs to a controller in the vehicle that is adapted to execute a plurality of control loops, each dynamic state input indicative of a dynamic state of the vehicle;
determining an operating mode of the vehicle;
determining a location of an optimum perceived yaw center of the vehicle corresponding to a selected estimation technique using the dynamic state inputs, such selected estimation technique being selected based upon the determined operating mode of the vehicle;
storing information related to the location of the optimum perceived yaw center for the plurality of the control loops; and
using the location of the optimum perceived yaw center as input for controlling the vehicle in a dynamic state.

2. The method of claim 1, further comprising:
determining the operating mode of the vehicle to be one of a transient mode or a limit handling mode at the dynamic state.

3. The method of claim 1, wherein the dynamic state inputs include at least a steering angle, a forward vehicle speed, a wheel angular velocity, and a tire normal force.

4. The method of claim 1 wherein the vehicle has a center of gravity, the method further comprising:
calculating a first offset distance from the location of the optimum perceived yaw center to the vehicle center of gravity;
storing information relating to the first offset distance for the plurality of the control loops; and
using the first offset distance as input for controlling the vehicle in the dynamic state.

5. The method of claim 4, further comprising:
calculating a second offset distance from the location of the optimum perceived yaw center to a location of an actual inertial center of rotation of the vehicle;
storing information relating to the second offset distance for the plurality of the control loops; and
using the second offset distance as input for controlling the vehicle in the dynamic state.

6. The method of claim 1, wherein the vehicle has a center of gravity and wherein determining the location of the optimum perceived yaw center for the vehicle is performed according to a relationship comprising:

$$v^*_y = v_x(\delta - L_r \alpha_f^{opt} - L_f \alpha_r^{opt})/L$$

$$r^* = v_x(\delta - L_r(\alpha_f^{opt} - \alpha_r^{opt}))/(L \times L_r)$$

$$v^*_y + dr^* \approx 0$$

where:
$\alpha_f^{opt}$ is a front optimum tire slip angle corresponding to a maximum feasible lateral force on vehicle front tires;
$\alpha_r^{opt}$ is an rear optimum tire slip angle corresponding to a maximum feasible lateral force on vehicle rear tires;
$v^*_y$ is an optimum lateral wheel center velocity;
$v_x$ is a vehicle longitudinal velocity;
$\delta$ is a ground steering angle;

L is a longitudinal distance between a front axle and a rear axle of the vehicle;

$L_r$ is a longitudinal distance between the rear axle and the vehicle center of gravity;

$L_f$ is a longitudinal distance between the front axle and the vehicle center of gravity;

d is a longitudinal distance between the center of gravity and the location of the optimum perceived yaw center; and r* is an optimum yaw rate.

7. The method of claim 6, further comprising:
determining the operating mode of the vehicle to be one of a transient mode or a limit handling mode at the dynamic state and using the relationship to determine the location of the optimum perceived yaw center when the vehicle is determined to be in the limit handling mode.

8. The method of claim 6, further comprising:
determining the operating mode of the vehicle to be one of a transient mode or a limit handling mode at the dynamic state, and estimating the optimum perceived yaw center when the vehicle is in the limit handling mode in accordance with the relationship of claim 6, and estimating the optimum perceived yaw center when the vehicle is determined to be in the transient mode to be located at a distance from the center of gravity to a vehicle rear axle.

9. The method of claim 1, further comprising:
determining the operating mode of the vehicle to be one of a transient mode or a limit handling mode at the dynamic state, and determining the location of the optimum perceived yaw center for the vehicle when determined to be in the limit handling mode according to a relationship comprising:

$$v^*_y = v_x(\delta - L_r \alpha_f^{opt} - L_f \alpha_r^{opt})/L$$

$$r^* = v_x(\delta - L_r(\alpha_f^{opt} - \alpha_r^{opt}))/(L \times L_r)$$

$$v^*_y + dr^* \approx 0$$

where:

$\alpha_f^{opt}$ is a front optimum tire slip angle corresponding to a maximum feasible lateral force on vehicle front tires;

$\alpha_r^{opt}$ is an rear optimum tire slip angle corresponding to a maximum feasible lateral force on vehicle rear tires;

$v^*_y$ is an optimum lateral wheel center velocity;

$v_x$ is a vehicle longitudinal velocity;

$\delta$ is a ground steering angle;

L is a longitudinal distance between a front axle and a rear axle of the vehicle;

$L_r$ is a longitudinal distance between the rear axle and the vehicle center of gravity;

$L_f$ is a longitudinal distance between the front axle and the vehicle center of gravity;

d is a longitudinal distance between the center of gravity and the location of the optimum perceived yaw center; and r* is an optimum yaw rate.

10. The method of claim 9 further comprising:
determining the location of the optimum perceived yaw center when the vehicle is determined to be in the transient mode according to the relationship wherein the location of the perceived yaw center is located on a rear axle of the vehicle.

11. A method of determining a location of an optimum perceived yaw center of a vehicle comprising:

sensing a plurality of dynamic state parameters of the vehicle; providing a plurality of dynamic state inputs which are representative of the dynamic state parameters to a controller in the vehicle that is adapted to execute a plurality of control loops; each dynamic state parameter indicative of a dynamic state of the vehicle;

determining an operation mode of the vehicle as one of a transient mode or a limit handling mode at each dynamic state;

determining a location of an optimum perceived yaw center based on a first approach when the vehicle is determined to be in the transient mode and determining the location of the optimum perceived yaw center based on a second approach when the vehicle is determined to be in the limit handling mode;

storing the information related to the location of the optimum perceived yaw center as input to a vehicle controller; and controlling the vehicle in response to the location of the optimum perceived yaw center as an input to the controller.

12. The method of claim 11, wherein calculating the location of the optimum perceived yaw center when the vehicle is determined to be in the transient mode is performed according to a relationship wherein the location of the optimum perceived yaw center is estimated to be located at a rear axle of the vehicle.

13. The method of claim 11, wherein determining the location of the optimum perceived yaw center when the vehicle is determined to be in the in the limit handling mode is performed according to a relationship comprising:

$$v^*_y = v_x(\delta - L_r \alpha_f^{opt} - L_f \alpha_r^{opt})/L$$

$$r^* = v_x(\delta - L_r(\alpha_f^{opt} - \alpha_r^{opt}))/(L \times L_r)$$

$$v^*_y + dr^* \approx 0$$

where:

$\alpha_f^{opt}$ is a front optimum tire slip angle corresponding to a maximum feasible lateral force on vehicle front tires;

$\alpha_r^{opt}$ is an rear optimum tire slip angle corresponding to a maximum feasible lateral force on vehicle rear tires;

$v^*_y$ is an optimum lateral wheel center velocity;

$v_x$ is a vehicle longitudinal velocity;

$\delta$ is a ground steering angle;

L is a longitudinal distance between a front axle and a rear axle of the vehicle;

$L_r$ is a longitudinal distance between the rear axle and a vehicle center of gravity;

$L_f$ is a longitudinal distance between the front axle and the vehicle center of gravity;

d is a longitudinal distance between the center of gravity and the location of the optimum perceived yaw center; and r* is an optimum yaw rate.

14. The method of claim 11, wherein the dynamic state parameters include at least a steering angle, a forward vehicle speed, a wheel angular velocity, and a tire normal force.

15. A system of controlling a vehicle, comprising:
a sensor system having a plurality of sensors for sensing dynamic state inputs, the dynamic state inputs indicative of a dynamic state of the vehicle;

a controller adapted to execute a plurality of control loops and receive the plurality of the dynamic state inputs during its operation to determine an operating mode;

the controller having a processor further adapted to estimate a location of an optimum perceived yaw center of the vehicle corresponding to a selected estimation technique, such estimation technique being selected based upon the determined operating mode of the vehicle; and an actuator system that is adapted to communicate with the controller to provide control of the dynamic state of the vehicle in response to the location of the optimum perceived yaw center.

16. The system of claim 15, wherein the processor is adapted to
determine the operating mode of the vehicle to be one of a transient mode or a limit handling mode at the dynamic state of the vehicle.

17. The system of claim 15, wherein the dynamic state inputs include at least a steering angle, a forward vehicle speed, a wheel angular velocity, and a tire normal force.

18. The system of claim 16, wherein the vehicle has a center of gravity and wherein when the vehicle is in the limit handling mode, the selected estimation technique to determine the location of the optimum perceived yaw center for the vehicle is performed according to a relationship comprising:

$$v^*_y = v_x(\delta - L_r \alpha_f^{opt} - L_f \alpha_r^{opt})/L$$

$$r^* = v_x(\delta - L_r(\alpha_f^{opt} - \alpha_r^{opt}))/(L \times L_r)$$

$$v^*_y + dr^* \approx 0$$

where:
$\alpha_f^{opt}$ is a front optimum tire slip angle corresponding to a maximum feasible lateral force on vehicle front tires;
$\alpha_r^{opt}$ is an rear optimum tire slip angle corresponding to a maximum feasible lateral force on vehicle rear tires;
$v^*_y$ is an optimum lateral wheel center velocity;
$v_x$ is a vehicle longitudinal velocity;
$\delta$ is a ground steering angle;
L is a longitudinal distance between a front axle and a rear axle of the vehicle;
$L_r$ is a longitudinal distance between the rear axle and the vehicle center of gravity;
$L_f$ is a longitudinal distance between the front axle and the vehicle center of gravity;
d is a longitudinal distance between the center of gravity and the location of the optimum perceived yaw center; and
$r^*$ is an optimum yaw rate.

* * * * *